July 19, 1932. W. DODD ET AL 1,867,812
AUTOMOBILE COMPASS
Filed March 23, 1931
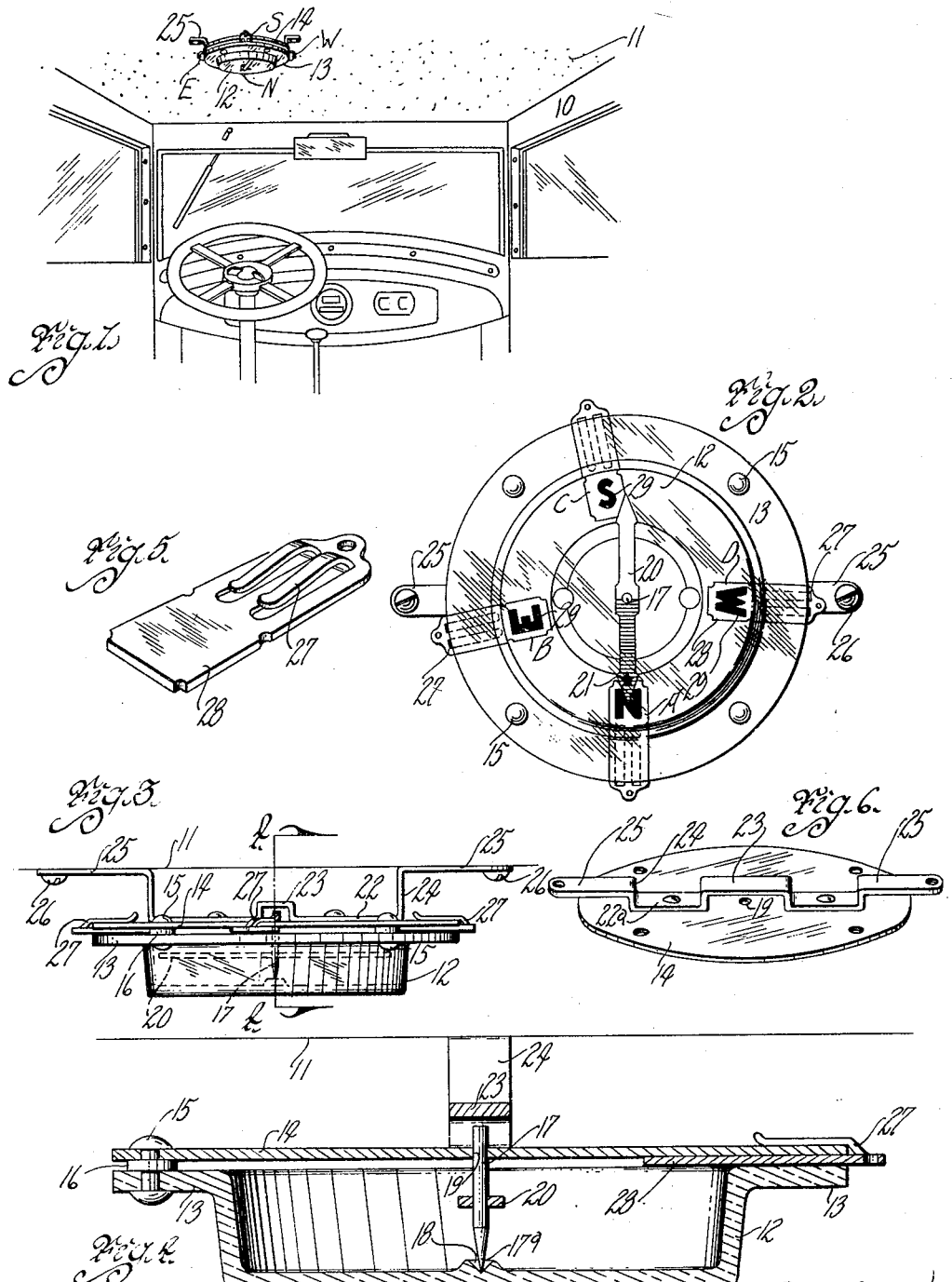

Patented July 19, 1932

1,867,812

UNITED STATES PATENT OFFICE

WEST DODD, OF DES MOINES, IOWA, AND GRANT C. CAYWOOD, OF OMAHA, NEBRASKA

AUTOMOBILE COMPASS

Application filed March 23, 1931. Serial No. 524,524.

The object of our invention is to provide a compass, which for convenience we call a world auto compass, which is particularly adapted to be mounted in the top of a motor vehicle, so that it can be conveniently observed by the occupants.

It is more particularly our purpose to provide a compass of simple construction on which cardinal indicating members may be mounted to conform to any magnetic conditions in the car at any place where the car is used.

With these and other objects in view, our invention consists in the construction, arrangement and combination of the various parts of our compass, whereby the objects contemplated are attained, as hereinafter more fully set forth, pointed out in our claims, and illustrated in the accompanying drawing, in which:—

Figure 1 is a perspective view of a portion of the interior of a motor vehicle equipped with a compass embodying our invention.

Figure 2 is an inverted plan view of the compass as the compass is looked at from the driver's seat.

Figure 3 is a side elevation of the compass.

Figure 4 is a detail, sectional view taken on the line 4—4 of Figure 3.

Figure 5 is a perspective view of one of the clips for carrying indicating cardinal characters; and Figure 6 is a perspective view of a different form of attaching bracket.

It is obvious that it is desirable under many conditions to have a compass in a motor vehicle mounted where it can be conveniently observed, preferably on the center of the arch above the driver's seat.

A reliable compass for an automobile must successfully harmonize and balance two nice factors. One of these is—"the various magnetic declinations in different regions of the earth"—and the other is—"the magnetic influence of metals of any car in which the compass may be placed."

No ordinary dial compass can possibly meet these demands in any automobile and give the true cardinal direction.

It is our purpose therefore to provide a compass which instead of having the ordinary dial has detachable or movable means for indicating directions, so as to take into consideration the earth's magnetic influence where the compass is to be used and also any variation from normal caused by the magnetic influence of the car.

In the accompanying drawing, we have used the reference numeral 10 to indicate generally the interior of a motor vehicle having the top 11 in which our compass is mounted.

We preferably make our compass with a case 12 made of crystal glass and having at the upper edge the annular outwardly extending peripheral flange 13. A suitable disc 14 of brass or other non-magnetic material which will not affect the compass needle is secured to the flange 13 by means of rivets 15 or any other suitable fastening devices.

Washers 16 are interposed between the disc 14 and the flange 13.

The pintle 17 has a sharp point 17a, which rests in a suitable recess 18. The upper end of the pintle 17 is journaled as at 19 in the disc 14.

The pintle 17 carries the compass needle 20 with its North Pole end 21, preferably having the form of an arrow head and distinguished in color from its other end.

A bracket of copper or the like has the central member 22 riveted or otherwise secured to the disc 14 having the central raised portion 23 to clear and protect the pintle 17.

At the ends of the portion 22 are the upright members 24 terminating in the horizontal fastening elements 25, which are intended to be secured to the under side of the top of the car by brass screw bolts 26 or other suitable fastening means.

In Figure 6, we have shown a slightly modified form of bracket 22a, which may be soldered to the disc.

We provide clips 27 having plate portions 28 on which are indicating letter characters 29.

The parts are so arranged that the plates 28 can be inserted between the flange 13 and the disc 14 as shown, for instance, in Figures 2 and 4, so that the indicating characters 29 will clearly show through the transparent case 12, although they will be adjacent to the disc 14.

In order to correctly install a world auto compass, the compass is attached to the cross bow of the top 11 by means of non-magnetic screws 26 through horizontal fastening elements 25 of the bracket 22. Next, it is necessary to place the car in a north and south position with the front of the car pointed north. Then the clips 27, which carry the indicating characters of the compass are mounted in the following manner:

First,—the clip 27, having the character indicating "north"—(see A, Figure 2) is mounted on the compass frame in a north and south line, as indicated by the needle, and at the north edge of the frame, to reach the north end of the compass needle. Second, the car is headed in the direction east, and the clip B (Figure 2) placed in position to show where the compass needle indicates east to be. Similarly the car is headed in the directions south and west respectively and the clips 27 indicated at C and D (Figure 2) are placed in position to show where the compass needle indicates south and west to be.

The four clips 27, carrying indicating characters "N", — "E", — "S" and "W" (see A, B, C and D, Figure 2) are now mounted in such a manner as will take care of any variations from normal, which arise by reason of the earth's magnetic declinations and the magnetic influence of the car in which the compass may be placed.

Thus it may occur that the clips A, B, C and D are not ninety degrees apart, but when they are installed as above mentioned, it will then be true that so long as the car is in the section of the country where the adjustment was originally made, the needle will always point toward the indicating character which indicates the direction in which the car is traveling.

For example, if the car is turned north, the needle will point to "N". If then the car is turned west, the needle will point to "W" and so on.

A world auto compass properly installed on any car in any section of the United States or other parts of the world will always indicate the cardinal direction in which the car is traveling, without readjustment, within an east and west direction of approximately 500 miles. It will indicate the direction in which the car is traveling without readjustment, close enough for all practical purposes within a distance of approximately 1000 miles. In case, the compass should be installed and adjusted for the extreme eastern section of the United States and the car should be taken from this eastern section to the extreme western section, and it is desired to have the compass indicate the true direction in the new location, the position of the character indicating clips can readily be adjusted, so that the earth magnetic variations will be taken into consideration in their installation.

A compass of this kind can be used in any part of the world by a simple readjustment of the separately movable indicating characters.

Of course, it will be obvious that the indicating characters are arranged differently around the compass from what they would be if the compass were viewed looking downwardly instead of looking upwardly.

It is of course obvious that some changes might be made in the details of the construction and arrangement of the parts of our compass, and it is our intention to cover by our claims, any modified forms of structure or use of mechanical equivalents, which may be reasonably included within their scope and within the scope of our invention.

We claim as our invention:

1. In combination with a compass, having a case and a transparent face, a plurality of direction indicating devices arranged within the case and visible through the face, having parts accessible for adjusting the devices from outside the case for placing them selectively in desired positions.

2. A compass adapted to be mounted on the inside of a car on the roof thereof comprising a case having a transparent face and sides, a back member connected with and spaced from the case, and clips adapted to be mounted on the compass and having platelike portions adapted to be projected into the space between the back member and the case and having indicating characters visible through the said transparent case face, said clips being separately adjustable around the compass.

3. In a compass of the kind described, a case having a transparent face and sides, a back for the case, and members supported on the compass having portions inside the compass provided with indicating characters and having portions projecting from the compass and adapted to be grasped for adjustment purposes.

Des Moines, Iowa, March 6, 1931.
WEST DODD.
GRANT C. CAYWOOD.